US 6,961,821 B2

(12) United States Patent
Robinson (10) Patent No.: US 6,961,821 B2
(45) Date of Patent: Nov. 1, 2005

(54) RECONFIGURABLE CACHE CONTROLLER FOR NONUNIFORM MEMORY ACCESS COMPUTER SYSTEMS

(75) Inventor: John T. Robinson, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 10/272,032

(22) Filed: Oct. 16, 2002

(65) Prior Publication Data

US 2004/0078524 A1 Apr. 22, 2004

(51) Int. Cl.⁷ .............................................. G06F 12/08
(52) U.S. Cl. ..................................... 711/133; 711/128
(58) Field of Search ................................ 711/133, 134, 711/128

(56) References Cited

U.S. PATENT DOCUMENTS

| | | | | | |
|---|---|---|---|---|---|
| 5,924,116 | A | * | 7/1999 | Aggarwal et al. | 711/122 |
| 6,272,598 | B1 | * | 8/2001 | Arlitt et al. | 711/133 |
| 6,317,778 | B1 | * | 11/2001 | Dias et al. | 711/133 |
| 6,360,298 | B1 | * | 3/2002 | Osanai et al. | 711/133 |
| 6,591,347 | B2 | * | 7/2003 | Tischler et al. | 711/134 |
| 6,640,286 | B2 | * | 10/2003 | Kawamoto et al. | 711/133 |
| 6,738,865 | B1 | * | 5/2004 | Burton et al. | 711/133 |

FOREIGN PATENT DOCUMENTS

WO    WO 200219115    *    3/2002    .......... G06F/12/00

OTHER PUBLICATIONS

Dar et al., "Semantic Data Caching and Replacement" Proceeding of the 22nd VLDB conf., 1996. , pp. 330–332.*

P.A. Franaszek et al., "Algorithms and Data Structures For Compressed Memory Machines", IBM J. Res. & Dev. vol. 45, No. 2, Mar. 2001, pp. 245–258.

P.A. Franaszek et al., "On Internal Organization In Compressed Random-Access Memoriess", IBM J. Res. & Dev. vol. 45, No. 2, Mar. 2001, pp. 259–270.

P.A. Franaszek et al., "IBM Memory Expansion Technology (MXT)", IBM J. Res. & Dev. vol. 45, No. 2, Mar. 2001, pp. 271–285.

Victor Delaluz et al., "Hardware and Software Techniques for Controlling DRAM Power Modes", IEEE Transactions on Computers, vol. 50, No. 11, Nov. 2001, pp. 1154–1173.

* cited by examiner

Primary Examiner—Pierre-Michel Bataille
(74) Attorney, Agent, or Firm—McGinn & Gibb, PLLC; Derek S. Jennings (57) ABSTRACT

A method and structure for replacing cache lines in a computer system having a set associative cache memory is disclosed. The method establishes ranking guidelines utilizing a writable cache replacement control array, wherein the guidelines can be dynamically changed by writing data to the cache replacement control array. The invention ranks states of different cache lines according to the ranking guidelines and replaces, upon a cache miss, a cache line having a highest rank of the rankings.

17 Claims, 5 Drawing Sheets

| INDEX | NODE | LRU POSITION |
|---|---|---|
| 0 | 1 | 0 |
| 1 | 2 | 0 |
| 2 | 3 | 0 |
| 3 | 1 | 1 |
| 4 | 2 | 1 |
| 5 | 3 | 1 |
| 6 | 1 | 2 |
| 7 | 2 | 2 |
| 8 | 3 | 2 |
| 9 | 1 | 3 |
| 10 | 2 | 3 |
| 11 | 3 | 3 |
| 12 | 0 | 0 |
| 13 | 0 | 1 |
| 14 | 0 | 2 |
| 15 | 0 | 3 |

FIG.5B

| INDEX | NODE | LRU POSITION |
|---|---|---|
| 0 | 0 | 0 |
| 1 | 1 | 0 |
| 2 | 2 | 0 |
| 3 | 3 | 0 |
| 4 | 0 | 1 |
| 5 | 1 | 1 |
| 6 | 2 | 1 |
| 7 | 3 | 1 |
| 8 | 1 | 2 |
| 9 | 2 | 2 |
| 10 | 3 | 2 |
| 11 | 1 | 3 |
| 12 | 2 | 3 |
| 13 | 3 | 3 |
| 14 | 0 | 2 |
| 15 | 0 | 3 |

FIG.5C

| INDEX | NODE | LRU POSITION |
|---|---|---|
| 0 | 3 | 0 |
| 1 | 3 | 1 |
| 2 | 3 | 2 |
| 3 | 3 | 3 |
| 4 | 2 | 0 |
| 5 | 2 | 1 |
| 6 | 2 | 2 |
| 7 | 2 | 3 |
| 8 | 1 | 0 |
| 9 | 1 | 1 |
| 10 | 1 | 2 |
| 11 | 1 | 3 |
| 12 | 0 | 0 |
| 13 | 0 | 1 |
| 14 | 0 | 2 |
| 15 | 0 | 3 |

RECONFIGURABLE CACHE CONTROLLER FOR NONUNIFORM MEMORY ACCESS COMPUTER SYSTEMS

BACKGROUND OF THE INVENTION

1. Field of the Invention

The present invention generally relates to the design of cache controllers for caches in computer systems in which there are variations in memory access latencies among the memories from which data is cached.

2. Description of the Related Art

Current practice in the design of set associative caches for computer systems is to use a predetermined and fixed replacement method in order to select a line to replace within a set when there is a cache miss that maps to the given set. For example, in a four-way set associative cache using LRU (least recently used) replacement, in order to handle a cache miss that maps to a given set, the cache controller would select the least recently referenced cache line among the four lines in the set to replace. The LRU information is encoded in the cache directory in this case, and the cache controller hardware updates the cache directory LRU information for each cache access. For speed, the replacement method is implemented as hardware logic. Although the design of caches, cache directories, and cache controllers has been extensively studied, an underlying assumption has been that the replacement method is fixed and implemented as hardware logic in the cache controller.

SUMMARY OF THE INVENTION

There is provided, according to one aspect of the invention, a cache controller for a set associative cache in a computer system that includes a Cache Replacement Control Array (CRCA). The CRCA is writable by system software. By loading the contents of the CRCA appropriately, the method by which the cache controller selects a line to replace for handling a miss can be dynamically reconfigured so as to improve performance, with no impact on the speed of the cache controller. The invention has applications for computer systems in which there are variations in memory access latency; for example, nonuniform memory access (NUMA) systems, compressed memory systems with uncompressed memory regions, computer systems in which certain main memory modules are operated in low power modes to reduce system power consumption, and so on. The CRCA contains an entry for every cache line state among a set of states that have been defined for replacement selection. For example, in the case of a NUMA system, one design includes a state for every (node, LRU position) pair, where "node" is the node number in the NUMA system from which the cache line was read, and "LRU position" is a number from 0 to K−1 (for a K-way set associative cache) which orders the lines in each set by last reference (with LRU position 0 referring to the most recently referenced line, LRU position 1 referring to the second most recently referenced line, etc.). In order to handle a miss, the cache controller determines the index in the CRCA of the state of each cache line in the set to which the miss maps, and selects for replacement that line in the state that has the largest such index. Furthermore, by instrumenting the cache controller, statistics on numbers of references to lines in various states, together with statistics on variations in memory access latencies to various memories, can be collected, and these statistics can be used to compute orderings of the states in the CRCA so as to minimize expected replacement penalties.

The invention includes a method of replacing cache lines in a computer system having a set associative cache memory. The method establishes ranking guidelines utilizing a writable cache replacement control array, wherein the guidelines can be dynamically changed by writing data to the cache replacement control array. The invention ranks states of different cache lines according to the ranking guidelines and replaces, upon a cache miss, a cache line having a highest rank of the rankings.

The invention can rank local node lines ahead of remote node lines, rank remote node lines ahead of local node lines, rank node lines having a lower latency ahead of node lines having a higher latency, rank node lines based upon node latency, rank memory lines within each node according to a least recently used method, rank nodes within the computer system according to a number of hits and misses of each node, and a number of memory references of each node.

The invention also presents a computer system that includes a set associative cache memory and a cache memory controller comprising a writable cache replacement control array. Guidelines are used to rank cache lines for replacement and can be dynamically changed by writing different data to the writable cache replacement control array. The cache replacement control array includes a plurality of comparators in large enough quantity to uniquely rank each of the cache lines.

BRIEF DESCRIPTION OF THE DRAWINGS

The foregoing and other objects, aspects and advantages will be better understood from the following detailed description of a preferred embodiment(s) of the invention with reference to the drawings, in which.

DETAILED DESCRIPTION OF PREFERRED EMBODIMENTS OF THE INVENTION

Figure 1:
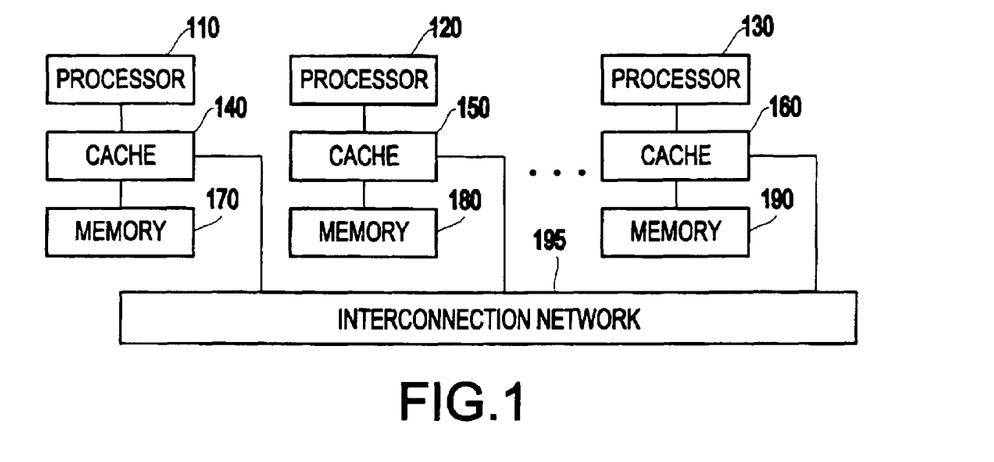
FIG. 1 is an example of a Multi-Node NUMA System.

As illustrated by the examples below there are cases in which it would be desirable to be able to reconfigure the replacement method used by the cache controller. A nonuniform memory access (NUMA) computer system consists of a number of nodes, each node containing a processor (or processors), a cache hierarchy, and a local main memory, together with an interconnection network. For convenience, only the cache immediately above the local main memory in each such node will be considered. A global real memory space is provided in such architectures by means of addressing schemes in which any node may address the real memory of any other node by means of inter-cache transfers. FIG. 1 illustrates a high-level system architecture of this type. As shown in FIG. 1, in a typical NUMA system there are a number of nodes, where each node consists of a processor (110 in the first node, 120 in the second node, and 130 in the last node), a cache (140 in the first node, 150 in the second node, and 160 in the last node), and a memory local to that node (170 in the first node, 180 in the second node, and 190 in the last node). Inter-cache transfers, which enable access from one node to a non-local (remote) memory of a different node, take place by means of an interconnection network (195). In each node, the cache at any point in time will contain a collection of lines both from the local memory and from the various remote memories in the NUMA system.

Given a cache miss, the latency in processing the miss depends on whether the miss is to a local or remote memory (hence the name "nonuniform memory access"). For example, if the time to process a local miss is on the average one time unit, the time to process a remote miss could average ten time units, that is possibly an order of magnitude longer. Consider the following situation: assume the cache is four-way set associative, with LRU replacement within each set, and suppose that there is a cache miss in which the LRU line in the set mapped to by the miss is a remote line, and the second LRU line in this set is a local line. Also, suppose that for each memory reference to any given set, the probabilities are 40% that it is a hit to the MRU (most recently used) line, 25% that it is a hit to the second MRU line, 15% that it is a hit to the second LRU line, 10% that it is a hit to the LRU line, and 10% that it is a miss. If the LRU line is replaced (which is a remote line), the expected penalty can be estimated as 0.1*10=1.0 memory access time units. However, if the second LRU line is replaced (which is a local line), the expected penalty can be estimated as 0.15*1= 0.15 time units. Therefore, in this particular case, it would be better to replace the second LRU line, rather than strictly following LRU replacement. This example illustrates that in the case of NUMA systems, improvements in memory access latency for handling cache misses can be obtained by taking into account not only the LRU position of each line in each set in a set associative cache, but also the probabilities that cache hits occur to each line according to its LRU position, together with the average times required to process a miss depending on whether the line is a local line or a line in one of the remote memories. It is therefore an object of the current invention, to provide a mechanism whereby the replacement logic of the cache controller can be reconfigured so as to improve average memory access latency in NUMA systems by taking such additional factors into account.

Figure 2:
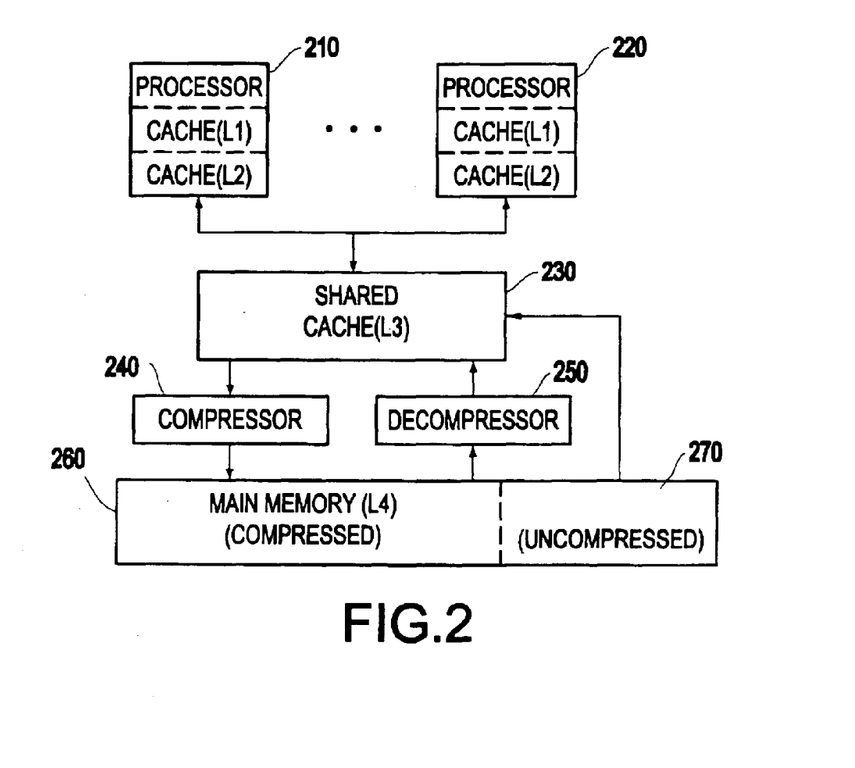
FIG. 2 is the Compressed Memory System with Uncompressed Memory Regions.

Another example in which it may be desirable to have a mechanism to reconfigure the replacement logic of the cache controller is a compressed memory system. In such a system, main memory is divided into a number of logically fixed size segments (the units of compression, also called lines), but each such logical segment is physically stored in a compressed format (with a segment being stored in an uncompressed format if it cannot be compressed). One way of implementing such systems is to make use of a cache between main memory and higher-level caches; to decompress lines on cache misses; and to compress lines on writebacks of modified cache lines. FIG. 2 illustrates a high-level system architecture for a compressed memory system of this type: processors, together with level 1 (L1) and level 2 (L2) caches (210, 220) share a large L3 cache (230) in which data is stored in uncompressed format. On a cache writeback, the data is compressed by a compressor (240) before being stored in main memory (260); conversely, on a cache miss, data is decompressed by a decompressor (250) as it is read from main memory (260). For more detailed discussions of such computer architectures, see for example the following: R. B. Tremaine, P. A. Franaszek, J. T. Robinson, C. O. Schulz, T. B. Smith, M. E. Wazlowski, and P. M. Bland, IBM Memory Expansion Technology (MXT), IBM Journal of Res. & Develop. 45, 2 (March 2001), pages 271–285; P. A. Franaszek and J. T. Robinson, On internal organization in compressed random access memories, IBM Journal of Res. & Develop. 45, 2 (March 2001), pages 259–270; and P. A. Franaszek, P. Heidelberger, D. E. Poff, and J. T. Robinson, Algorithms and data structures for compressed-memory machines, IBM Journal of Res. & Develop. 45, 2 (March 2001), pages 245–258.

In such systems it may be desirable for performance reasons to have certain portions of the memory stored in an uncompressed format. Although in practice the uncompressed regions would generally not be stored contiguously, for convenience of illustration a collection of uncompressed memory regions is shown as uncompressed memory 270 in FIG. 2. Memory references to uncompressed memory avoid decompression latency, and thus can be considerably faster. Assuming for the convenience of an example that memory references to uncompressed memory are ten times faster, the example above for NUMA systems applies in the straightforward way to the compressed memory system with uncompressed memory regions (that is, local memory in the NUMA system corresponds to uncompressed memory in the compressed memory system, and remote memory in the NUMA system corresponds to compressed memory in the compressed memory system in terms of the example illustrating the potential benefits of non-LRU replacement when memory access latencies are taken into account).

Figures 3, 4:
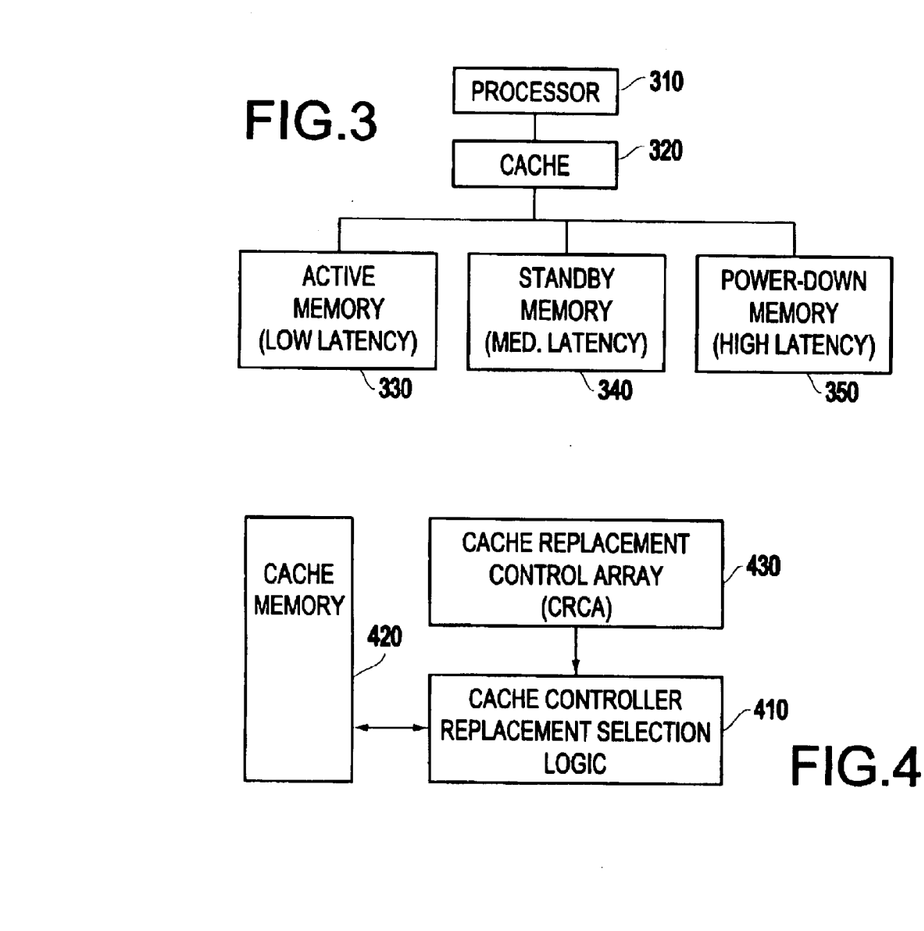
FIG. 3 is an example of a System with Main Memories in Various Active or Low Power Modes with Different Access Latencies.
FIG. 4 is the Cache Controller with Cache Directory and CRCA.

A further example in which it may be desirable to have a mechanism to reconfigure the replacement logic of the cache controller is a computer system in which to reduce power consumption, certain main memory modules are operated in a low power mode. Various low power modes for DRAM memories are described, for example, in the paper "Hardware and Software Techniques for Controlling DRAM Power Modes", by Delaluz et al, in IEEE Transactions on Computers, Vol. 50, No. 11, November 2001, pages 1154–1173. There is a trade-off between power consumption and speed: low power modes for DRAMs increase memory access latency. An example of computer system in which there are main memory modules in various low power modes is shown in FIG. 3, in which there is a processor (310), a cache (320), a memory module in the usual active (full power) mode (330), a memory module in a standby power mode (340) with increased memory access latency, and a memory module in a power-down power mode (350) with very high memory access latency. Thus, similar to the above examples, there are cases in which improved expected cache performance could be achieved by using a replacement method that takes into account the memory latency of the memory module from which each cache line resides.

Yet another example involves the modified status of each line in a given set. In order to replace a modified line, for a store-in cache (which is typical for today's high performance caches) it is necessary to first write back the line to memory (in practice, typically the writeback takes place by moving the modified line to a writeback buffer, and the writeback takes place asynchronously). However a clean (i.e., non-modified) line can be replaced without a writeback. Thus, there is additional time involved when replacing a modified line as compared to a clean line, and this information could be used to improve expected cache performance if the replacement method took this information into account.

As the above discussion illustrates, there are numerous examples in which expected cache performance for set associative caches could be improved by using a replacement method that takes into account the expected penalty for replacing each line in a given set, as opposed to using a fixed and predetermined method, for example LRU replacement implemented as hardware logic in the cache controller. However, in general it is impossible to predict at design time what the expected penalties will be. Although it may be possible in some cases to predict variations in memory access latencies for a given computer system design (local as opposed to remote memory in a NUMA system for example, given details of DRAM memories used, interconnection network speed, along with many other design details), these variations could change depending on workload and other factors (for example, there is a dependency on contention in the interconnection network for NUMA systems). Furthermore, the probabilities of re-reference for each cache line in a given set can in general not be predicted, since this is highly workload dependent. It is therefore an object of the current invention to provide a mechanism whereby the replacement logic of the cache controller can be dynamically reconfigured, with no impact on the speed of the cache controller.

The invention will be described first by means of some examples of contents of a Cache Replacement Control Array, referred to subsequently as the CRCA. The CRCA is an array in the cache controller, writable by system software, that controls the replacement method used by the cache controller. Thus, the replacement method used by the cache controller can be reconfigured by writing new values into the CRCA. As noted above, current practice in the design of cache controllers is to use a fixed and predetermined replacement selection method implemented in hardware logic; using a CRCA to control replacement selection is one difference the invention presents. The use of the CRCA is illustrated at a high level in FIG. 4, in which cache controller logic 410 uses the cache directory 420 and the CRCA 430 in order to determine which cache line to replace in a given set when there is a cache miss that maps to that set. The format and contents of the CRCA will, in general, depend on the type of system for which the cache controller is designed (for example, NUMA systems, scalable NUMA systems, compressed memory systems with uncompressed memory regions, computer systems with memory modules in various active and low power modes, and so on). The examples below will be described in the context of a 4 node NUMA system (as described above, and as illustrated for the general multi-node case in FIG. 1), in which the caches (140, 150, . . . , 160) are 4-way set associative. For these examples, contents of the CRCA will be shown for node 0 in the 4 node NUMA system; the contents would be modified in the straightforward way for the other nodes of the system. It is also assumed for these examples that memory access latencies could vary for each node of the system, that is, there could be four significantly different expected memory access latencies for memory references from node 0 to its local memory and to remote memories in nodes 1, 2, and 3 (modifications to support highly scalable NUMA systems will subsequently be described). It is also assumed that the LRU position of each of the four cache lines in a given set is maintained by the cache controller and recorded in the cache directory (as is typical in current caches using LRU replacement). Given these assumptions, each line in the cache could be in one of sixteen possible states that are of interest for replacement selection purposes: there are four LRU positions (say 0, 1, 2, and 3, where 0 is the MRU line, 1 is the second MRU line, 2 is the second LRU line, and 3 is the LRU line), and four possible nodes from which the cache line was read (nodes 0, 1, 2, and 3).

In general terms, the CRCA contains an entry for every state, among a collection of states that have been defined for replacement selection, that are possible states for cache lines, and the ordering of these states in the CRCA determines which cache line is selected for replacement. More specifically, for the 4 node NUMA system with 4-way set associative caches, the CRCA will contain sixteen entries in a given order. Each such entry has an index in the CRCA, ranging from 0 to 15 in this example, and a cache line is selected for replacement as follows. For each of the four cache lines in the set to which the cache miss maps, the invention finds the (LRU position, node) state of the line. For each of these four states (which will necessarily be four different states since each cache line has a different LRU position) the invention finds the index of the state in the CRCA. Then, the invention selects the cache line with the state that has the largest index in the CRCA to replace.

Figure 5A:
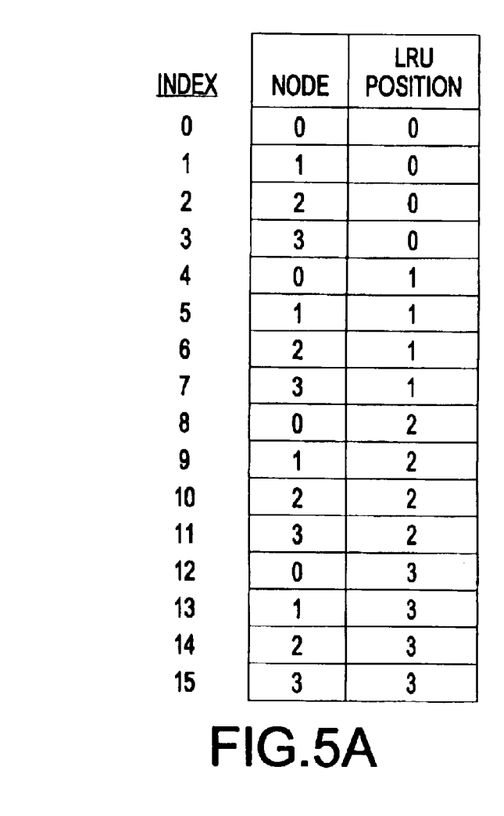
FIG. 5A is the CRCA for Strict LRU Replacement (4 Node NUMA Example)

For example, in the case of a 4 node NUMA system with 4-way set associative caches the CRCA could be written as follows: a CRCA that implements strict LRU replacement is shown in FIG. 5A. This implements strict LRU replacement since the four states with LRU position 0 (that is, the MRU line) have the smallest CRCA indexes (0 through 3), the four states with LRU position 1 (that is, the second MRU line) have the next CRCA indexes (4 through 7), the four states with LRU position 2 (that is, the second LRU line) have the next CRCA indexes (8 through 11), and the four states with LRU position 3 (that is, the LRU line) have the largest CRCA index (12 through 15).

Figure 5B:
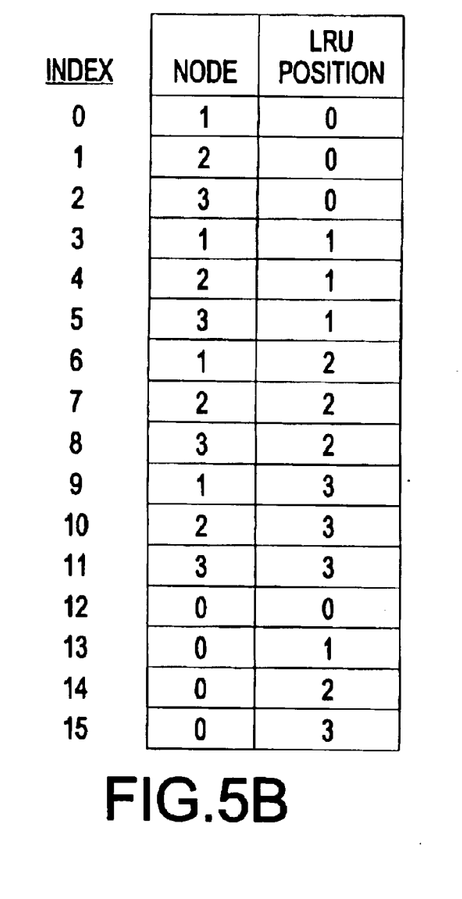
FIG. 5B is the CRCA for Local Line Priority Replacement (4 Node NUMA Example)

Another example would be that in the 4 node NUMA system memory access is highly nonuniform between a local node and remote nodes, and that it is always advantageous to select a local line rather than a remote line to replace, using the LRU local line if there is more than one in the set. In this example it is assumed that the memory access times are approximately uniform for remote nodes, so if there are no local lines in a set, that is, all lines in the set are remote lines, then the LRU line will be selected. A CRCA that implements this replacement method is shown in FIG. 5B (where as mentioned above the CRCA is shown for node 0, that is, node 0 is the local node). To see that this CRCA implements the previously described replacement method, first note that those states in which the line is a local line (that is, those states with node 0) have the largest CRCA indexes (12 through 15), and therefore a cache line in one of these states will be selected for replacement if there is one. Also note that these four states are ordered by LRU position, so that if there is more than one local line, the LRU line will be selected for replacement. If there are no local lines in the set, all lines will be in one of the states in the CRCA with indexes 0 through 11. Note that these are ordered by LRU position, that is, the states with LRU position 0 appear first (with indexes 0, 1, 2), followed by the states with LRU position 1 (with indexes 2, 3, 4), etc. Therefore, if all lines in a set are remote lines the LRU line will be selected for replacement.

Another example which is an illustration of the implementation of a specific replacement rule will now be given.

Figure 5C:
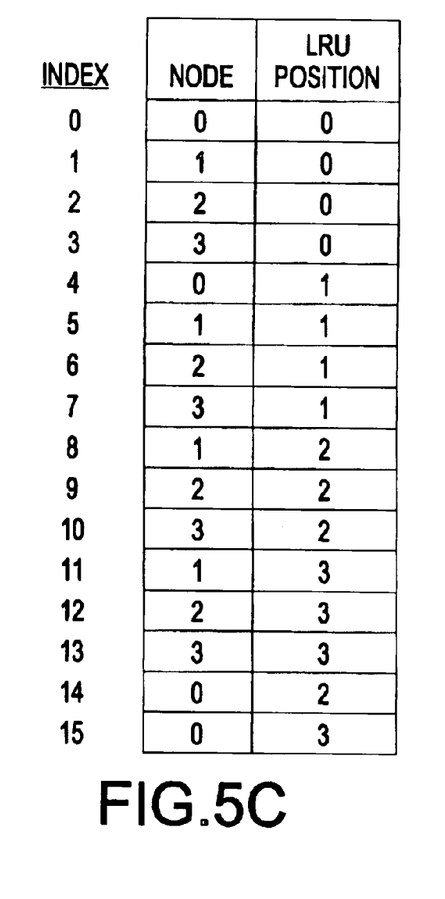
FIG. 5C is the CRCA for LRU/Second LRU Lines Replacement Rule (4 Node NUMA Example)

Such a replacement rule (in the context of the 4 node NUMA system) could be as follows: always replace the LRU line, unless the LRU line is a remote line and the second LRU line is a local line, in which case replace the second LRU line. A CRCA implementing this replacement rule is shown in FIG. 5C. Note that local lines with LRU positions 2 or 3, at CRCA indexes 14 and 15, are first selected for replacement if they are present in the set, otherwise the replacement selection follows LRU ordering (CRCA array indexes 0 through 13). Thus, the CRCA of FIG. 5C implements the previously described rule.

Figure 5D:
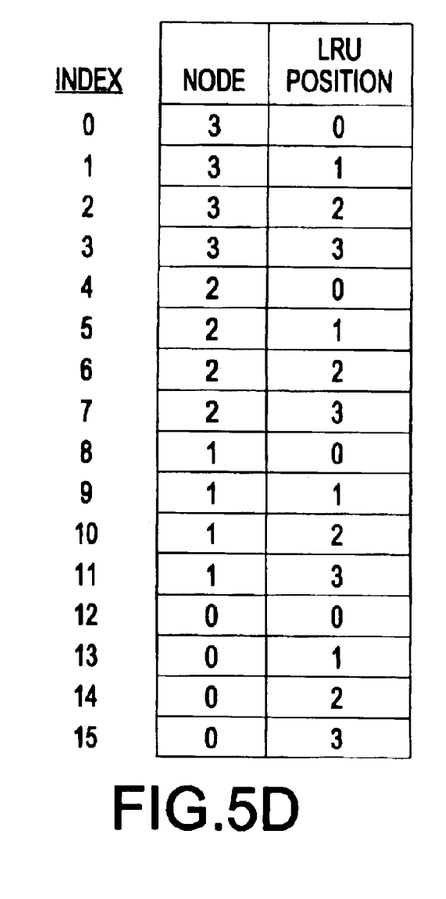
FIG. 5D is the CRCA for Priority Replacement by Node (4 Node NUMA Example)

Another example would be that the memory access times from node 0 in the 4 node NUMA system are highly nonuniform, with very high latency to the remote memory of node 3, high latency to the remote memory of node 2, medium latency to the remote memory of node 1, and low latency to the local memory. In such a case it may be desirable to strictly prioritize cache replacement by node number, with lines from node 0 having the highest priority for replacement, lines from node 1 having the next highest priority for replacement, lines from node 2 having the next highest priority for replacement, and finally lines from node 3 having the lowest priority for replacement, using LRU to select among lines from the same node. A CRCA implementing this replacement method is shown in FIG. 5D, in which lines from node 0 at CRCA indexes 12 through 15 have the highest priority of replacement, lines from node 1 at CRCA indexes 8 through 11 have the next highest priority of replacement, and so on, and where groups lines from the same node are ordered by LRU position.

An example of how the contents of the CRCA can be computed so as to minimize expected replacement penalties follows. This computation relies on the collection of cache access statistics as follows. For the purposes of this example it is assumed that the cache controller has been instrumented so as to collect counts of cache hits to lines in LRU positions 0, 1, 2, 3, say C[0], C[1], C[2], and C[3], counts of total memory access cycles used for memory references resulting from misses to each node, say T[0], T[1], T[2], and T[3], and counts of memory references (resulting from misses) to each node, say R[0], R[1], R[2], R[3]. Note that although current cache controllers do not have performance instrumentation to this level of detail, there is currently a trend in the design of cache controllers to provide increased performance instrumentation. Given these counters, the penalty for replacing a line from node n in LRU position p can be estimated as proportional to C[p]×(T[n]/R[n]). Note that if it was expected that locality of reference could vary among nodes, an array of counters C[p,n] could be maintained, where C[p,n] is a count of hits to lines in LRU position p from node n, and an estimate of the replacement penalty would then be proportional to C[p,n]×(T[n]/R[n]) (however this approach uses more counters in the cache controller). These methods of estimating replacement penalties are similar to the estimation of replacement penalties as described in U.S. Pat. No. 6,385,699, "Managing an Object Store based on Object Replacement Penalties and Reference Probabilities", Bozman, Robinson, and Tetzlaff, May 7, 2002, assigned to IBM and incorporated here in by reference, for example (although the approach described there is more general, and without suitable restrictions not appropriate for cache controller hardware, but rather applicable to software managed caches with objects of varying sizes, among many other essential differences). In any case, having computed the values C[p]×(T[n]/R[n]), or C[p,n]×(T[n]/R[n]) for the second approach, for each (node, LRU position) pair, a CRCA that will minimize the expected replacement penalty can be computed by sorting the states in order of decreasing replacement penalties. In this scenario, system software would periodically read the counters described above, compute a CRCA to minimize expected replacement penalties, write the CRCA, and reset the counters. Alternatively, lacking cache controller performance instrumentation to this level of detail, a CRCA could be computed by means of offline analysis of a given workload, using trace-driven or execution-driven simulation of a performance model of the system for example.

Figure 6:
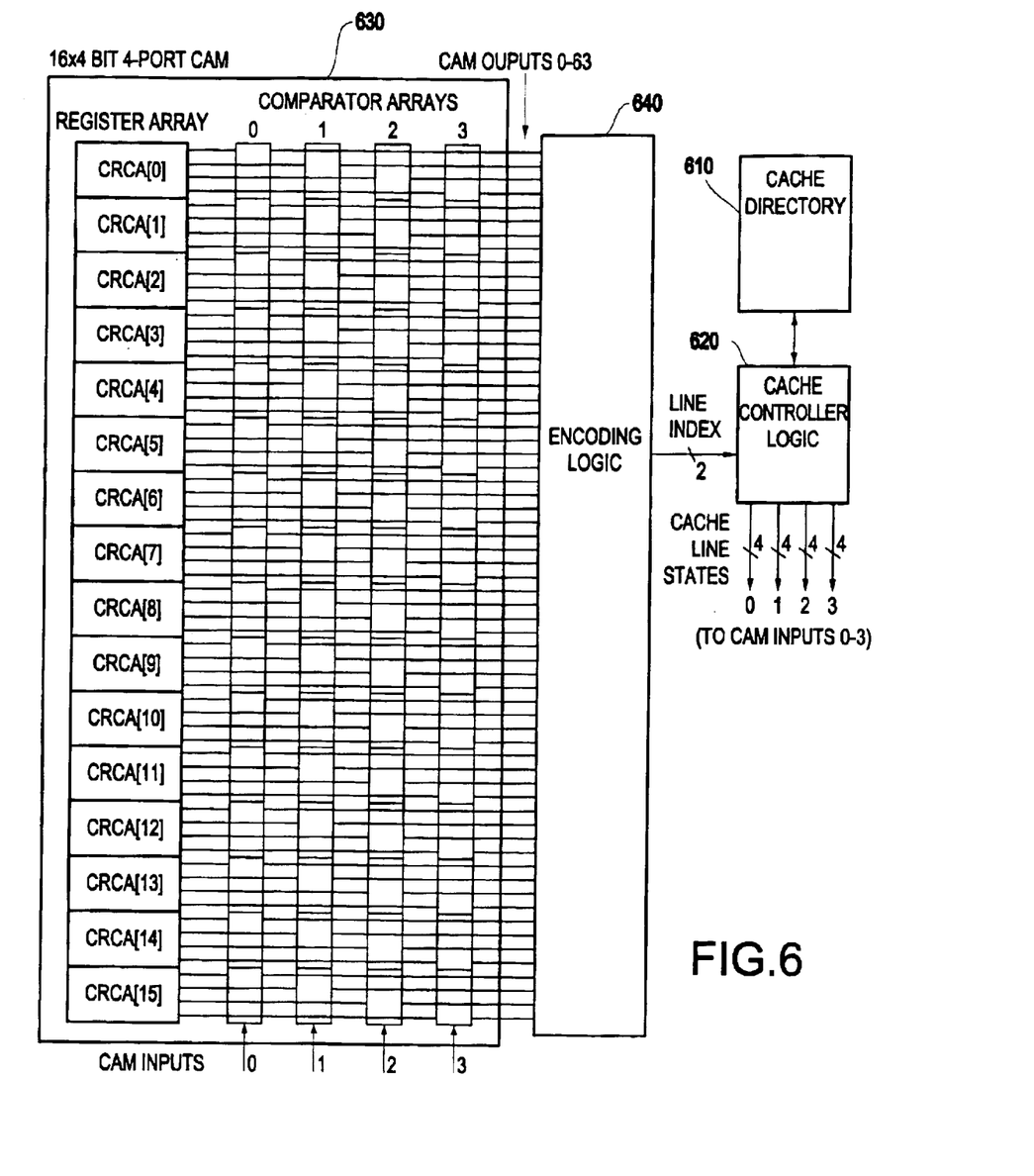
FIG. 6 is the Control Logic for Using CRCA to Select Line to Replace (4 Node NUMA Example)

Having given examples of possible contents of a CRCA, together with an example of how a CRCA that should minimize expected replacement penalties could be computed either using performance statistics, or lacking performance statistics by means of offline analysis, next the operation of the CRCA in the cache controller replacement logic will be described in more detail. A content addressable memory (or CAM, also called an associative memory) consists of a register array holding the memory contents of the CAM, together with an array of comparators that allow a CAM input to be compared simultaneously with every value stored in the CAM. By expanding the array of comparators, multiple CAM inputs can be compared simultaneously with every value stored in the CAM; if there are N CAM inputs this will be referred to as a N-port CAM. Note that a CAM of size M (that is, the CAM holds M values) with N ports requires M×N comparators and has M×N outputs. Each such output is either "true" (compares equal) or "false" (compares not equal). FIG. 6 illustrates an overview of hardware logic for a cache controller to select a line to replace, assuming the 4 node NUMA example, with 4-way set associative caches, and with CRCA formats as in FIGS. 5A through 5D. Each CRCA entry consists of a (node, LRU position) pair, which in the context of this example requires 4 bits (2 bits for the node number and 2 bits for the LRU position). Using the cache directory 610, cache controller logic 620 finds the four states (node, LRU position) for the lines in the set to which a miss has mapped. These four states are routed as four CAM inputs to a 4-port 16×4 bit CAM 630 (that is, the CAM memory stores 16 4-bit values and has 4 4-bit inputs and 4 groups of 16 1-bit outputs). The writable CRCA is implemented as the register array contents CRCA[0] through CRCA[15] of the CAM 630. The results of the CAM outputs are four "compares equal" signals on exactly 4 of the 4×16=64 CAM outputs (since each line is necessarily in a different and distinct state). Encoding logic 640 selects the largest CAM output with "compares equal" and encodes this as a value from 0 to 3 corresponding to the CAM input that produced this output. Finally, this value is used as an index into the cache lines in the set in order to select the cache line to replace.

Figure 7:
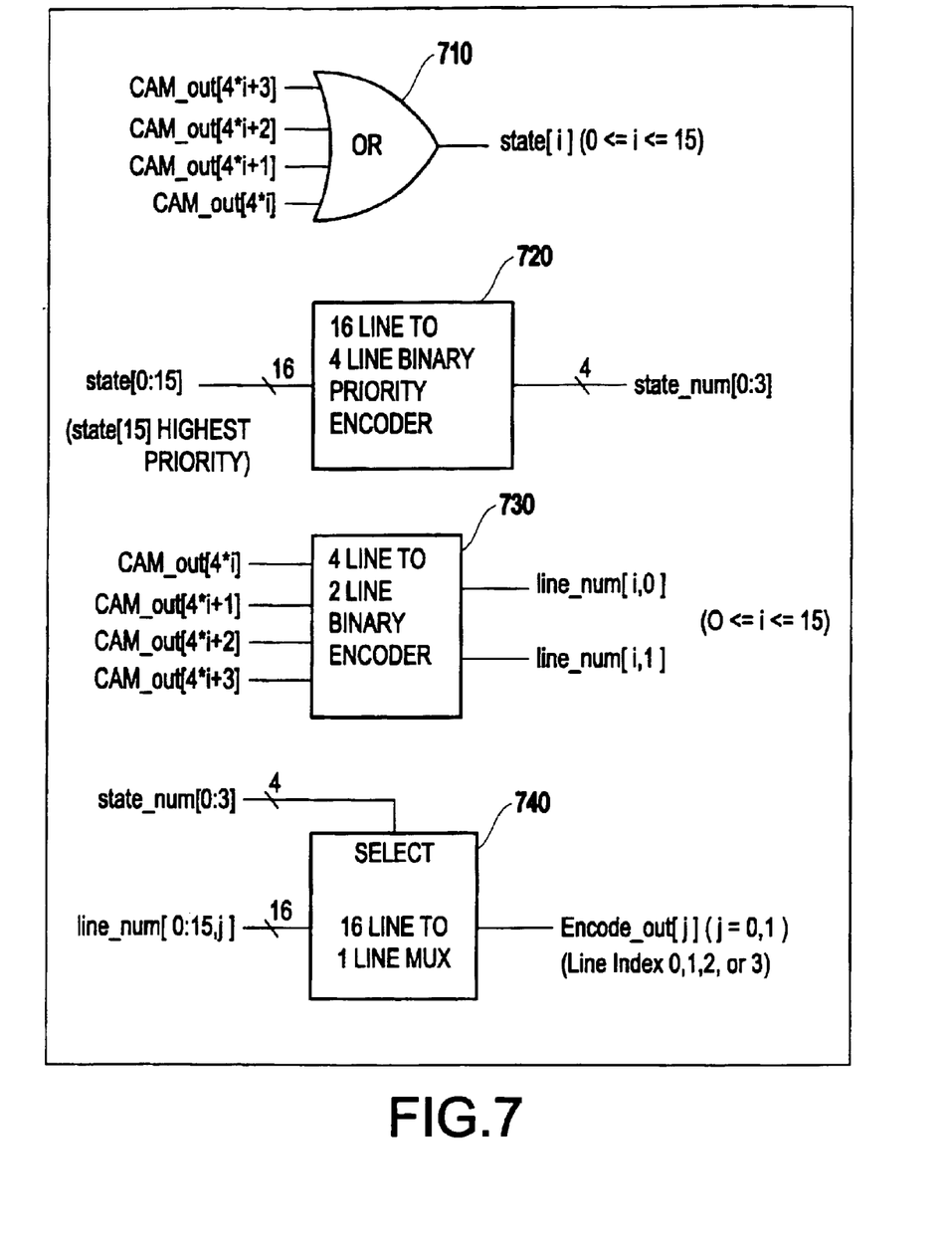
FIG. 7 is the Encoding Logic (4 Node NUMA Example).

FIG. 7 illustrates an implementation of the encoding logic component 640 of FIG. 6. Sixteen state signals state[i] (0<=i<=15) are determined from consecutive groups of four CAM outputs by means of sixteen "OR" gates 710. The "true" state signal with the largest index is found and its index is encoded as a 4-bit binary number state_num[0:3] by means of a 16 line to 4 line binary priority encoder 720. Sixteen 2-bit cache line numbers line_num[i,j] (0<=i<=15; j=0,1) are produced from consecutive groups of four CAM outputs by means of sixteen 4 line to 2 line binary encoders 730. Finally, the 2-bit line index output of the encoding logic is produced by two 16 line to 1 line multiplexors 740, with the 4-bit state number state_num[0:3] selecting the appropriate high order and low order line number bits (line_num [i,0] and line_num[i,1]).

Alternative equivalent hardware implementations will naturally occur to those skilled in the art. In particular, in the design illustrated by FIGS. 6 and 7, the gate count can be significantly reduced (using custom logic design) by noting that lines with states corresponding to CRCA indexes 0, 1, and 2 can never be selected for replacement. This is simply because the line with the highest corresponding CRCA index will be selected, and since there are four lines this index must be 3 or larger. This means that, starting with the CAM 630, registers holding CRCA[0], CRCA[1], and CRCA[2] can be eliminated, and all subsequent logic depending on the values of these registers can be eliminated as well. Although the resulting optimized design is not as conceptually clear as the design shown, it is logically equivalent in terms of replacement selection. In this particular case, this optimization would reduce the gate count by approximately $13/16$, that is by about 80%.

Having described, in detail, the use of a CRCA in a 4 node NUMA system with 4-way set associative caches, various generalizations to the above are as follows. In order to more easily support scalability in NUMA systems, as a first example, instead of having entries in the CRCA for every (node, LRU position) pair, the "node" component of these entries could take on only two values, corresponding to local or remote. That is, in this example, all remote nodes would be lumped together, and the cache replacement control array used by each of the different nodes would have eight entries (assuming 4-way set associative caches), regardless of the number of nodes in the system.

As a second slightly more complex example of scalability support, NUMA nodes could be classified as (1) local, (2) low-latency remote, (3) medium-latency remote, and (4) high-latency remote. System software would classify all remote nodes (on any given local node) into one of the remote node classes, using for example the hardware timers T[n] and reference counters R[n] described above. Additionally, each cache controller would have an array L (written by software) of length equal to the number of nodes in the system, where each entry L[i] takes on four values, depending on whether node i is the local node or a remote node in one of these four classes. Last, the CRCA would have entries of the form (class, LRU position), where "class" takes on four values corresponding to the four classes of nodes listed above. In this example, all remote nodes would be grouped into three classes, and the CRCA used by each of the different nodes would have 16 entries (assuming a four-way set associative cache), regardless of the number of nodes in the system.

Finally, as described by means of examples in the earlier description of related art, there are cases other than NUMA systems in which access to memory is nonuniform, including compressed memory systems with uncompressed memory regions, and systems in which (to reduce power consumption) certain memory modules are operated in various low power modes. Another example is that in which replacement penalties depend on the clean or modified state of a cache line. Applications of the use of a CRCA to support cache replacement choices that minimize expected replacement penalties for these types of systems are analogous in a straightforward way to the use of a CRCA in NUMA systems, since the nonuniformity of memory access times in all these systems and examples is the common property of these systems and examples that makes the use of a writable CRCA desirable.

While the invention has been described in terms of preferred embodiments, those skilled in the art will recognize that the invention can be practiced with modification within the spirit and scope of the appended claims.

What is claimed is:

1. A computer system comprising:
a set associative cache memory; and
a cache memory controller comprising a writable cache replacement control array,
wherein guidelines used to rank states of cache lines for replacement can be dynamically changed by writing different data to said writable cache replacement control array,
wherein said guidelines rank states of different cache lines within each set of cache lines independently of rankings within other sets of cache lines, wherein each set of cache lines comprises a cache line from each way of said set associative cache memory,
wherein upon a cache miss within a set of cache lines, a cache line in said set of cache lines having a highest rank of said states is replaced before other cache lines in said set of cache lines having lower state rankings, and
wherein said writable cache replacement control array encodes a mapping of cache line states to cache line replacement selection rankings.

2. The computer system in claim 1, wherein said cache replacement control array includes a plurality of comparators in large enough quantity to uniquely rank each of said cache lines.

3. The computer system in claim 1, wherein said guidelines rank local node lines ahead of remote node lines.

4. The computer system in claim 1, wherein said guidelines rank remote node lines ahead of local node lines.

5. The computer system in claim 1, wherein said guidelines rank node lines having a lower latency ahead of node lines having a higher latency.

6. The computer system in claim 1, wherein said guidelines rank node lines based upon node latency and ranks memory lines within each node according to a least recently used method.

7. The computer system in claim 1, wherein said guidelines rank nodes within said computer system according to a number of hits and misses of each node, and a number of memory references of each node.

8. The computer system in claim 1, further comprising, connected to said set associative cache memory, a nonuniform main memory comprising at least one of:
a compressed main memory;
an uncompressed main memory; and
a low-power mode main memory operating at a lower power level than other main memory portions.

9. A computer system comprising:
a set associative cache memory;
a cache memory controller operatively connected to said set associative cache memory; and
a writable cache replacement control array operatively connected to said cache memory controller,
wherein said writable cache replacement control array comprises an array of comparators in which the number of comparators is on the order of the product of the number of entries in said cache replacement control array and the degree of set associativity,
wherein said array of comparators are structured to allow parallel comparisons of the state of each of the lines in a cache set with every entry in said cache replacement control array, and in which the result of said parallel comparisons is a number of equal comparisons; and
wherein said writable cache replacement control array is adapted to select a cache line to replace in said cache set by locating a cache line that has an equal comparison with the entry in said cache replacement control array having the highest replacement priority according to a predetermined ordering of replacement priority positions in said cache replacement control array.

10. A method of replacing cache lines in a computer system having a set associative cache memory, said method comprising:

establishing ranking guidelines utilizing a writable cache replacement control array which encodes a mapping of cache line states to cache line replacement selection ranks, wherein said guidelines can be dynamically changed by writing data to said writable cache replacement control array;

ranking states of different cache lines within each set of cache lines according to said ranking guidelines independently of rankings within other sets of cache lines, wherein each set of cache lines comprises a cache line from each way of said set associative cache memory; and replacing, upon a cache miss, a cache line within a set of cache lines, for which one of the cache lines in said set of cache lines is to be replaced, having a highest rank of said states of cache lines in said set of cache lines.

11. The method in claim 10, wherein said ranking ranks local node lines ahead of remote node lines.

12. The method in claim 10, wherein said ranking ranks remote node lines ahead of local node lines.

13. The method in claim 10, wherein said ranking ranks node lines having a lower latency ahead of node lines having a higher latency.

14. The method in claim 10, wherein said ranking ranks node lines based upon node latency and ranks memory lines within each node according to a least recently used method.

15. The method in claim 10, wherein said ranking ranks nodes within said computer system according to a number of hits and misses of each node, and a number of memory references of each node.

16. The method in claim 10, further comprising writing from said set associative cache memory to a nonuniform main memory comprising at least one of:

a compressed main memory;

an uncompressed main memory; and a low-power mode main memory operating at a lower power level than other main memory portions.

17. A method for use with a computer system having a set associative cache memory, a cache memory controller, and a writable cache replacement control array, said method comprising:

selecting, by said cache memory controller, cache lines to replace for processing cache misses, wherein said selecting is controlled by said writable cache replacement control array;

maintaining each cache line, at any point in time, in exactly one of a predetermined collection of states, such that within each set in the cache memory, at any point in time, each cache line in said set is in a state, in said predetermined collection of states, that is different than the state of each of the other cache lines in said set; and maintaining said cache replacement control array to have an entry corresponding to each of the states in said predetermined collection of states;

wherein said selecting includes, within each set in the cache memory, selecting a cache line for replacement by determining the position in said cache replacement control array corresponding to the state, in said predetermined collection of states, of each cache line in said set, and selecting for replacement that cache line which has a state that corresponds to the highest replacement priority position among the positions determined in said cache replacement control array, according to a predetermined ordering of replacement priority positions in said cache replacement control array.

* * * * *